(No Model.)
E. PECKHAM.
CAR WHEEL.
No. 376,722. Patented Jan. 17, 1888.
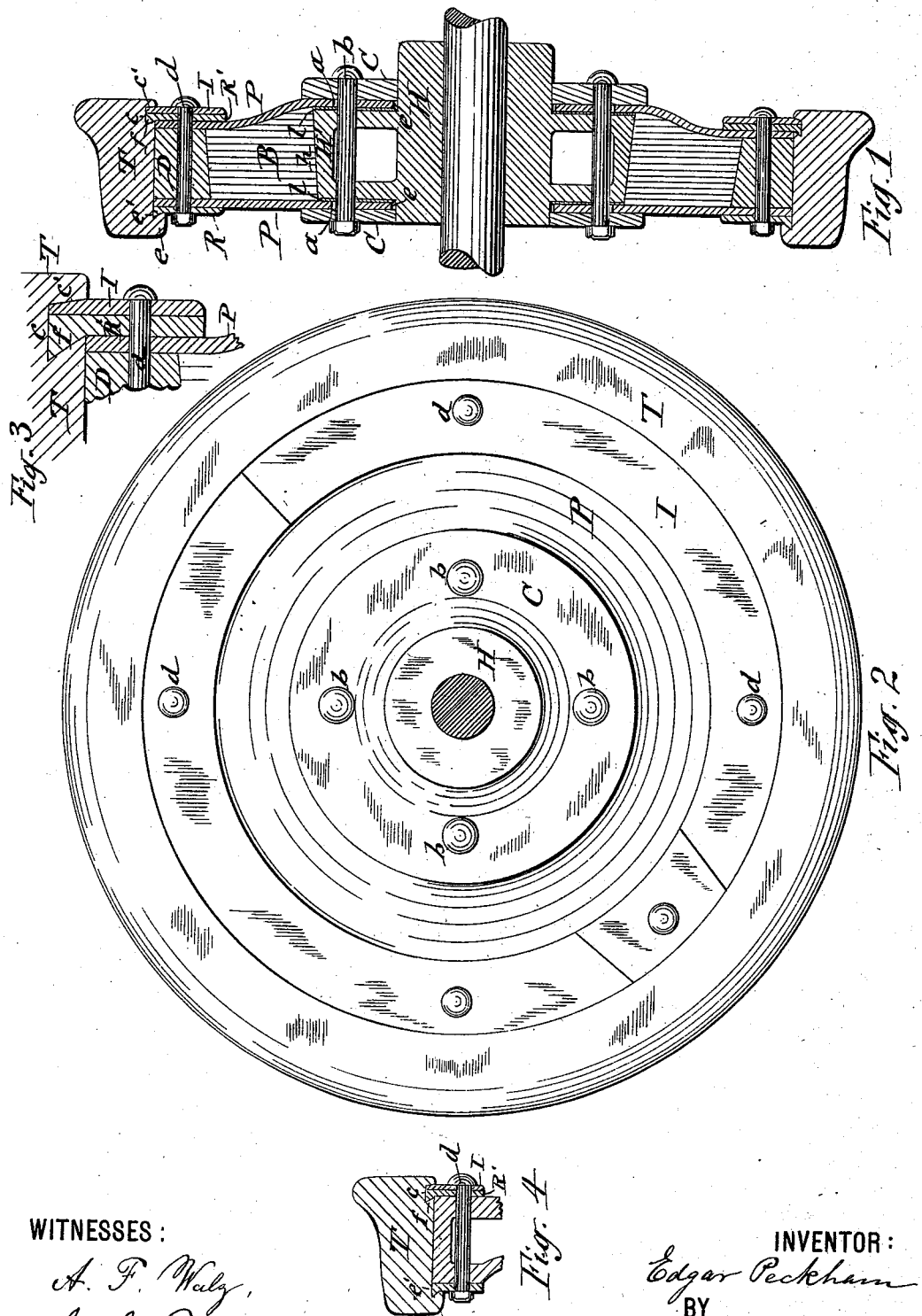
WITNESSES:
A. F. Walz,
C. L. Bendixon,
INVENTOR:
Edgar Peckham
BY
Dull, Laass & Dull
ATTORNEYS.
N. PETERS, Photo-Lithographer, Washington, D. C.

UNITED STATES PATENT OFFICE.

EDGAR PECKHAM, OF SYRACUSE, NEW YORK, ASSIGNOR TO THE PECKHAM CAR WHEEL COMPANY, OF NEW YORK.

CAR-WHEEL.

SPECIFICATION forming part of Letters Patent No. 376,722, dated January 17, 1888.

Application filed October 20, 1887. Serial No. 252,896. (No model.)

*To all whom it may concern:*

Be it known that I, EDGAR PECKHAM, of Syracuse, in the county of Onondaga, in the State of New York, have invented new and useful Improvements in Car-Wheels, of which the following, taken in connection with the accompanying drawings, is a full, clear, and exact description.

This invention relates to the class of car-wheels in which the body of the wheel is constructed separately from the hub and the tire separately from the body.

My present invention consists in improved construction and combination of the constituent members of the wheel, possessing superior strength and stability, as hereinafter fully explained, and specifically set forth in the claims.

In the annexed drawings, Figure 1 is a transverse section of a car-wheel, showing my improvements embodied in a wheel having a paper or other non-metallic core. Fig. 2 is a face view of the rear side of the wheel. Fig. 3 is an enlarged detail view of the connection of the retaining-rings with the tire, and Fig. 4 is a sectional view of the tire-locking devices in connection with a metallic wheel-body.

Similar letters of reference indicate corresponding parts.

H represents the hub of the wheel. This hub I form with a central circumferential enlargement, H', upon which is seated the core B, of paper or other non-metallic material, said core being confined between the hub and outer ring, D, by the web-plates P P, secured to the ends of the hub enlargement H' and sides of the ring D, as hereinafter described.

In order to enlarge the bearings of the core B and to relieve the web-plates from the strain due to the pressure of the flange of the tire against the side of the rail, tending to crowd the tire off from the core B, I form the hub enlargement H' with an outwardly-beveled peripheral face, *h*, and bevel the inner peripheral face of the ring D, preferably parallel with the bevel of the hub, and the core B, I provide with a central eye, beveled to correspond to the bevel of the hub enlargement H', upon which it is seated, and the outer peripheral face of the core I bevel to correspond to the aforesaid beveled inner face of the ring D, as shown in Fig. 1 of the drawings.

The plates P P are secured to the ends of the hub enlargement H' by collars C C, mounted on the end portions of the hub and clamped against the sides of the aforesaid plates by bolts or rivets *b*, passing transversely through said collars, plates, and hub enlargement. To properly cushion the wheel, I make the central eyes, *e*, of the plates P P of greater diameters than those of the end portions of the hub, and thus allow radial play of the plates and cause the non-metallic core B to carry the load which is thrown on the wheel. To relieve the bolts or rivets *b* from shearing strain, I elongate the holes *a a*, through which they pass, and by inserting linings *l l*, of paper or other suitable non-metallic material, between the ends of the hub enlargement H' and adjacent portions of the plates P P the latter are relieved from jars, which tend to crystallize the metal.

The plates P P are secured to the outer ring, D, by the retaining-ring R, applied to the exterior of one of said plates, and the retaining-ring R' and locking-ring I, applied to the exterior of the other plate, and bolts or rivets *d*, passing transversely through said rings and plates. The inner circumferences of the rings R R', I make smaller than that of the ring D, so as to cause the rings R R' to reach past the ring D toward the center of the wheel, and thus brace the plates P P. T denotes the tire, which I secure to the body of the wheel by forming the tire with an inward-projecting undercut projection, *e*, and forming the outer edge of the retaining-ring R with a correspondingly-shaped outward projection, *e'*, entering the undercut projection of the tire. Said retaining-ring R, being composed of wrought-iron or steel, affords a more secure hold than the cast-iron ring D, which hitherto was formed with the interlocking projection *e'*. Furthermore, in case of breakage the retaining-ring R is much easier renewed than the ring D and the body of the wheel is maintained intact. At the opposite side of the wheel I provide the inner peripheral face of the tire with a groove, *c*, the inner side wall of which is undercut, and the outer side wall thereof is beveled, as shown at *c'*. The retaining-ring R' and locking-ring I, I make of sufficiently greater circumference than the plate P and ring D to project into the groove c. The outer peripheral portion of the retaining-ring R', I form with an inward projection, f, entering the undercut side of the groove c, and the outer edge of the locking-ring I, I bevel to correspond to the beveled side of the groove c, into which it projects. In order to allow the rings R' and I to be inserted into the groove c, I divide each into sections, and first introduce the ring R', then insert the sections of the ring I, and in forcing the same into the beveled groove c, I wedge the ring R' tightly in its seat in the groove, and thus securely lock the tire on the wheel. The bolts or rivets d d, passing through the sections of the rings R' and I and through the plates P P and ring D, serve to firmly unite all of said parts.

Having described my invention, what I claim as new, and desire to secure by Letters Patent, is—

1. The combination of the hub H, formed with the central enlargement, H', the web-plates P P, embracing between them said enlargement of the hub and having their central eyes of greater diameters than the end portions of the hub, and provided with the elongated holes a a, the core B, seated upon the enlargement H' of the hub, the collars C C, seated on the end portions of the hub, and bolts or rivets b b, passing through the holes a a and through the collars and fastening the latter on the web-plates, substantially as described and shown.

2. The combination of the hub H, formed with the central enlargement, H', and with a beveled peripheral face on said enlargement, the web-plates P P, embracing between them the enlargement of the hub, the core B, provided with a correspondingly-beveled eye seated on the peripheral face of the hub, and the collars C C, seated on the end portion of the hub and secured to the sides of the web-plates, substantially as described and shown.

3. In combination with the outer ring, D, web-plates P P, and core B, the retaining-rings R R', having their inner circumference smaller than that of the ring D, substantially as described and shown, for the purpose specified.

4. The combination of the ring D, formed with a beveled inner peripheral face, and the core B, provided with a correspondingly-beveled outer peripheral face seated on the inner face of the ring, substantially as described and shown.

5. The combination of the hub provided with a beveled peripheral face, the outer ring, D, having its inner peripheral face beveled parallel to the bevel of the hub, and a wheel-body seated between said hub and ring and provided with corresponding beveled bearings, substantially as described and shown.

6. In combination with the wheel-body, the tire locked on the body at one side and provided at the opposite side with the circumferential groove c, formed with the beveled outer wall, c', and the sectional locking-ring I, having its outer edge beveled correspondingly, substantially as described and shown.

7. In combination with the wheel-body, the tire formed at one side with the undercut inward projection, e, and provided at the opposite side with the groove c, having an undercut inner wall and beveled outer wall, c', the retaining-rings R R', interlocking, respectively, with the undercut projection e and undercut wall of the groove c, and the sectional locking-ring I, having its outer edge beveled and inserted into beveled portion of the groove c, substantially as described and shown.

8. In combination with the wheel-body, the tire formed at one side of its inner peripheral face with the undercut inward projection, e, and the wrought-metal retaining-ring R, secured to the side of the body and formed with an outward-projecting flange, e', interlocking with the projection l, substantially as described and shown.

9. In combination with the wheel-body, the tire formed at one side of its inner peripheral face with the undercut projection e and at the opposite side with the groove c, the wrought-metal retaining-ring R on one side of the body and formed with an outward-projecting flange, e', interlocking with the projection e, sectional retaining-rings on the opposite side of the wheel-body entering in the groove c, and bolts or rivets securing said retaining-rings to the body, substantially as described and shown.

In testimony whereof I have hereunto signed my name, in the presence of two witnesses, at Syracuse, in the county of Onondaga, in the State of New York.

EDGAR PECKHAM. [L. S.]

Witnesses:
HOWARD P. DENISON,
C. L. BENDIXON.